United States Patent [19]

Mineck

[11] Patent Number: 4,635,995
[45] Date of Patent: Jan. 13, 1987

[54] DETACHABLY MOUNTED ADD ON SUN VISOR FOR VEHICLES

[75] Inventor: Fred Mineck, Kingman, Ariz.

[73] Assignee: Warren F. B. Lindsley, Phoenix, Ariz. ; a part interest

[21] Appl. No.: 794,473

[22] Filed: Nov. 4, 1985

[51] Int. Cl.⁴ .............................................. B60J 3/02
[52] U.S. Cl. ............................................... 296/97 G
[58] Field of Search ............... 296/97 G, 97 D, 97 R; 160/DIG. 3; 24/563, 543, 67.9

[56] References Cited

U.S. PATENT DOCUMENTS

| | | | |
|---|---|---|---|
| 341,710 | 5/1886 | White | 24/563 |
| 2,134,414 | 10/1938 | Norcross | 296/97 |
| 2,228,209 | 1/1941 | Harrington | 296/97 |
| 2,239,240 | 4/1941 | Magness | 296/97 |
| 2,733,763 | 2/1956 | Nygaard | 160/32 |
| 3,042,958 | 7/1962 | Spears | 16/84 |
| 3,195,946 | 7/1965 | Van Sickle | 296/97 C |
| 3,254,435 | 6/1966 | Rix | 40/129 |
| 3,649,069 | 3/1972 | Zip | 296/97 |
| 3,853,370 | 12/1974 | Barnhart | 296/97 |
| 3,858,931 | 1/1975 | Van Sickle | 296/97 C |
| 4,090,732 | 5/1978 | Vistitsky | 296/97 |
| 4,167,287 | 9/1979 | Franklin | 296/97 G |
| 4,352,519 | 10/1982 | Aro | 296/97 G |
| 4,442,881 | 4/1984 | Monteath et al. | 160/25 |

*Primary Examiner*—Robert R. Song
*Attorney, Agent, or Firm*—Warren F. B. Lindsely

[57] ABSTRACT

An add on sun visor for positioning over the exposed lower edge of the conventional vehicle mounted sun visor and employing a substantially U-shaped clamp means for gripping the surface of the vehicle mounted sun visor and readily movable therealong to position the add on sun visor at any one of a plurality of positions along its length.

1 Claim, 7 Drawing Figures

DETACHABLY MOUNTED ADD ON SUN VISOR FOR VEHICLES

BACKGROUND OF THE INVENTION

This invention relates to sun visors for automobiles and other vehicles, and more particularly, to a detachably mounted add on sun visor which may be readily mounted on, adjustably positioned, and removed from conventional sun visors mounted interiorally of a vehicle.

Conventional vehicle sun visors consist of a single panel which can be pivoted to a position in which some of the rays of the sun are prevented from reaching the eyes of the driver and passengers in the vehicle. In many instances, the sun is not intercepted by such conventional sun visors, particularly early morning and late afternoon sun rays through the windshield of the vehicle.

DESCRIPTION OF THE PRIOR ART

Sun visor extensions are known which are fixedly attached to and slidably movable on the conventional sun visor of a vehicle to intercept the early morning and late afternoon sun rays which the conventional sun visor cannot block. Others have proposed sun shades which employ adjustment means for horizontal and vertical movement.

The following patents are illustrative thereof, but not anticipatory of the novelty of this invention.

U.S. Pat. Nos. 2,239,240; 2,228,209 and 2,753,763 all disclose sun shields comprising a visor with an extendable shieldable member mounted inside of the visor.

U.S. Pat. No. 4,442,881 discloses a removable windshield protective device for application midway of the width of the windshield of a vehicle and having roller curtains capable of being withdrawn over the windshield from the center to each side of the windshield and attached thereto.

U.S. Pat. Nos. 4,090,732; 3,853,370 and 2,134,414 all show sun shields where an auxiliary shielding member is extendably mounted on the outside of the visor.

U.S. Pat. Nos. 3,649,169; 3,254,435 and 3,042,958 all disclose vacuum means for attaching a sun visor to a window or for other related uses.

Nones of these patents disclose a sun visor which can be detachably mounted on the conventional sun visor and readily moved laterally and longitudinally of the sun visor for sun ray blocking use and removed when not needed with a minimum of effort.

SUMMARY OF THE INVENTION

In accordance with the invention claimed, a new and novel add on sun visor employing a single clamping means is disclosed which can be readily attached and removed from any conventional vehicle mounted sun visor.

It is, therefore, one object of this invention to provide a new and improved add on sun visor that can be added to or removed from a conventional sun visor of a vehicle with a minimum of effort and without moving its surface.

Another object of this invention is to provide a new and improved add on sun visor for conventional vehicle furnished sun visors which is provided with an integral U-shaped clamp for detachably mounting on and freely movable about the surface of a conventional sun visor by the operator of the vehicle while driving.

A further object of this invention is to provide a new and improved auxiliary add on sun visor which can be used at will and stored when not in use in the glove compartment or under a seat of the vehicle.

A still further object of this invention is to provide a new plastic add on shield that may be positioned in any position on the conventional sun visor of a vehicle and changed at will to compensate for the changing direction of the sun or vehicle.

A still further object of this invention is to provide a simple and inexpensive supplemental add on sun visor that may be readily mounted on, re-positioned on, and removed from, a conventional sun visor of a vehicle even though the sun visor may comprise a built in mirror and mirror cover arrangement.

These and other objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
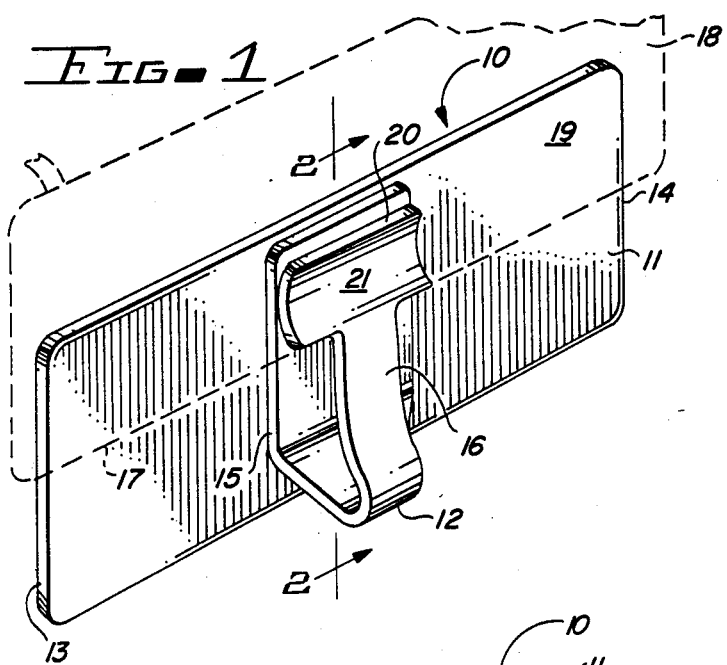
FIG. 1 is a perspective view of an improved add on sun visor for detachably mounting on the conventional sun visors of a vehicle and embodying the invention.
Figure 2:
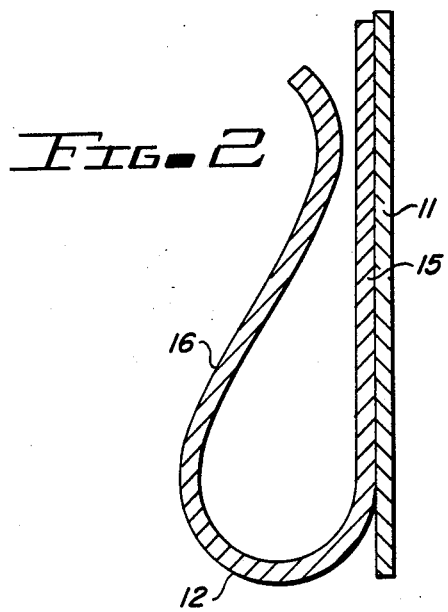
FIG. 2 is a cross-sectional view of FIG. 1 taken along the line 2—2.
Figure 3:
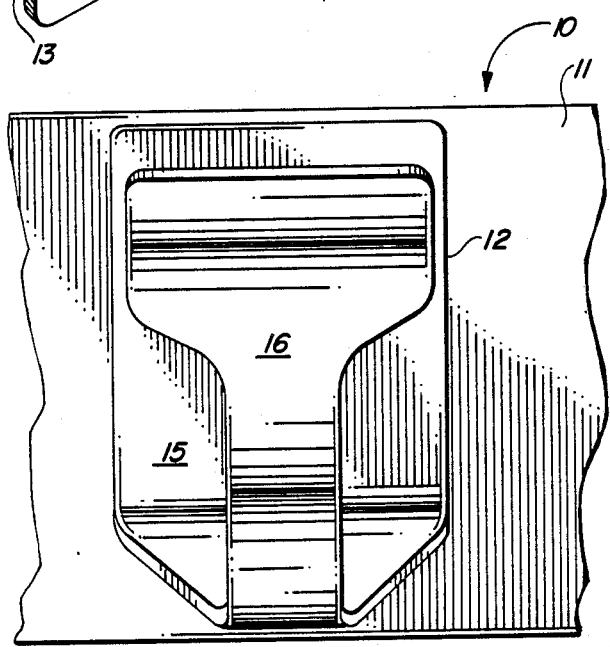
FIG. 3 is an enlarged partial front view of the clamping means shown in FIGS. 1 and 2.
Figure 4:
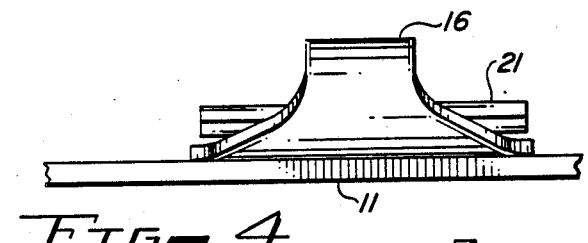
FIG. 4 is a partial bottom view of FIGS. 1 and 2 showing particularly the clamping means.

Referring more particularly to the drawing by characters of reference, FIGS. 1-3 disclose an add on sun visor 10 for detachably mounting over the bottom edge of any conventional vehicle mounted sun visor.

Sun visor 10 may comprise an opaque or translucent shield or flat panel 11 of any suitable geometrical shape which is intended to be attached to and readily movable over the surface of the conventional vehicle mounted sun visor so as to enlarge its sun blocking area when needed and easily moved to another place on the same conventional sun visor or to a position on a different conventional sun visor or placed in storage in the glove compartment or under the front seat of the vehicle when not needed.

In order to firmly hold the sun visor on the surface of the conventional vehicle mounted sun visor, a suitable clamp means such as a substantially U-shaped clamp means 12 is provided which clamp may be formed integral with or attached to panel 11, as shown in the various figures of the drawing.

Clamp means 12 is so positioned on panel 11 midway between its ends 13 and 14 that it may receive between its legs 15 and 16 the bottom unattached edge 17 of a conventional vehicle mounted sun visor 18 diagraphically shown by dash lines for purposes of illustration only. It should be noted that the vehicle mounted sun visor 18 is mounted by trunnions to suitable brackets secured within the vehicle for adjustment of sun visor 18 at various angles with respect to the windshield.

The clamping means 12 of the add on visor 18 of this invention is intended for detachably and movably mounting the add on visor 10 to the already existing conventional sun visor 18 and to do so by merely slipping it up and over its bottom edge 17 and around the lower portion of its front and back substantially coplanar surfaces. Even though the conventional vehicle mounted sun visors may have mirrors and covering lids mounted therein, the new and novel add on sun visor 10 may be readily clamped on it in the manner shown in FIG. 1.

As shown, clamp means 12 comprises a U-shaped configuration with the flat surface of its leg 15 which may be a rectangular configuration secured by gluing or otherwise to the juxtapositioned flat surface 19 of add on visor 10. Its other leg 16 is bent to cause its free end 20 to be biased and lie close to leg 15. Thus, the spring biased effect of clamp means 12 causes the free end 20 of leg 16 to frictionally engage between it and leg 15 the lower portion of the conventional vehicle mounted sun visor 18 as diagraphically shown in FIG. 1.

In order to grip the conventional sun visor 18 over an uneven area, the free end of leg 16 of clamp means 12 is provided with a pad 21 which extends laterally of the longitudinal length of leg 16.

This pad 21 on the end of leg 16 also serves as a pivot point so that the add on visor 10 may be pivotally rotated about the conventional sun visor at any point along its length at which the add on visor 10 is positioned.

Figure 5:
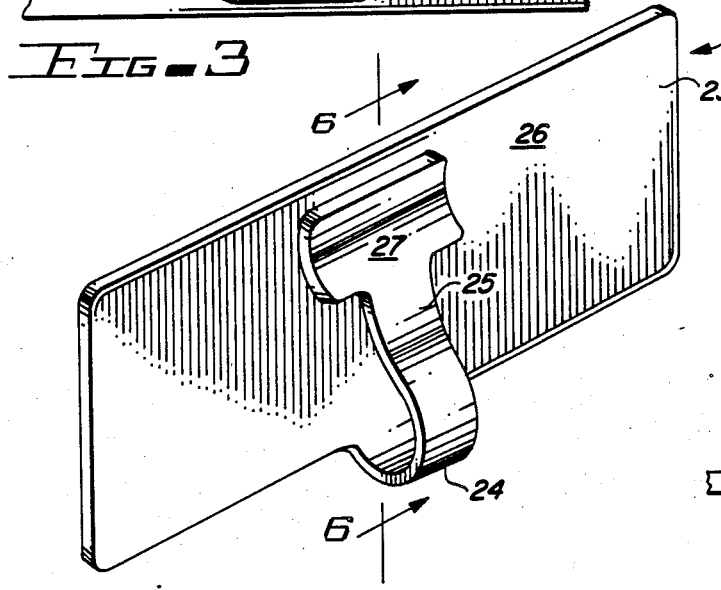
FIG. 5 is a perspective view of a modification of the add on sun visor shown in FIGS. 1-4 wherein the clamp forms an integral part of the sun visor shield.
Figure 6:
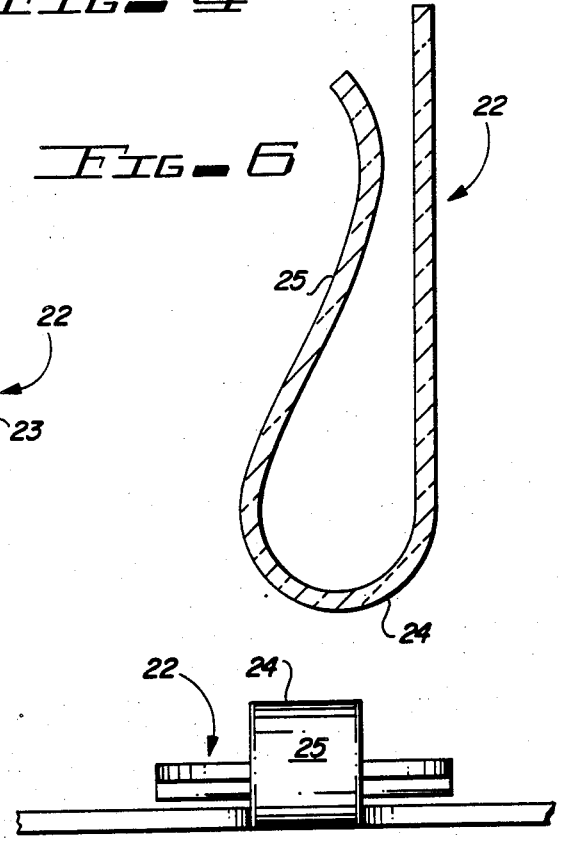
FIG. 6 is a cross-sectional view of FIG. 5 taken along the line 6—6.
Figure 7:
FIG. 7 is a partial bottom view of the add on sun visor shown in FIG. 6 showing particularly the clamping means.

FIGS. 5-7 disclose a modification of the add on sun visor 10 shown in FIGS. 1-4. This modification comprises an add on sun visor 22 having a flat shield or panel 23 similar to device 10 except that its clamp means 24 is formed integral with panel 23, as shown. One leg 25 of the clamp means 24 is formed like leg 16 of clamp means 12 to be biased toward the flat surface 26 of panel 23 to receive between its free end formed by pad 27 and the surface 26 of panel 23 the lower edge of the conventional vehicle mounted sun visor 18 in the manner described above for FIGS. 1-4.

In operation, the user merely grasps the add on visor and moves it freely along the surface of the conventional sun visor to any position needed to block the sun rays not effectively shielded by the conventional sun visor.

Thus, an improved sun visor is provided which may be readily attached to and removed from any visor surface of a vehicle with little or no difficulty. The sun visor may be inexpensively manufactured and sold and eliminates or avoids any installation charges since none are needed.

Although two embodiments of the invention have been illustrated and described, it will be apparent to those skilled in the art that various changes and modifications may be made therein without departing from the spirit of the invention or from the scope of the appended claims.

What is claimed is:

1. An add on sun visor for sliding over an exposed edge of a vehicle mounted conventional sun visor comprising:

an opaque shield in the form of a flat panel, and a clamp means comprising at least one leg secured at one end to said panel and bent back on itself in a spring biased arrangement toward said panel to form between the other end of said leg and the panel a slot for receiving therein the exposed edge of the conventional sun visor, said one leg being formed integral with one edge of said panel, whereby when the edge of the conventional sun visor is inserted in said slot, the add on visor may be adjustably positioned at any one of a plurality of positions along its length.

* * * * *